United States Patent
Zhou et al.

(10) Patent No.: US 10,410,124 B1
(45) Date of Patent: Sep. 10, 2019

(54) DISPLAY FOR DISPLAYING LIFTING CAPACITY OF A LIFTING MACHINE AND RELATED METHODS

(71) Applicant: Link-Belt Construction Equipment Co., L.P., LLLP, Lexington, KY (US)

(72) Inventors: Peter Zhou, Lexington, KY (US); Kuruparan Mahendranathan, Lexington, KY (US); Dennis Schnieders, Lexington, KY (US); Bryan Sheroan, Lexington, KY (US)

(73) Assignee: Link-Belt Cranes, L.P., LLLP, Lexington, KY (US)

( * ) Notice: Subject to any disclaimer, the term of this patent is extended or adjusted under 35 U.S.C. 154(b) by 978 days.

(21) Appl. No.: 14/159,602

(22) Filed: Jan. 21, 2014

Related U.S. Application Data

(60) Provisional application No. 61/754,816, filed on Jan. 21, 2013.

(51) Int. Cl.
  *G06N 5/00* (2006.01)
  *B66C 23/00* (2006.01)
  *G06N 5/04* (2006.01)

(52) U.S. Cl.
  CPC ..................... *G06N 5/04* (2013.01)

(58) Field of Classification Search
  CPC .......... B66C 23/90; B66C 23/905; G06N 5/04
  See application file for complete search history.

(56) References Cited

U.S. PATENT DOCUMENTS

| | | | |
|---|---|---|---|
| 3,073,280 A * | 1/1963 | Thiel | B66C 23/90 212/283 |
| 3,362,022 A * | 1/1968 | Mork | B66C 23/90 116/202 |
| 3,479,984 A * | 11/1969 | Deluca, Jr. | B66C 23/90 33/370 |
| 3,505,514 A * | 4/1970 | Fathauer | B66C 23/905 340/685 |
| 3,757,066 A * | 9/1973 | Sterner | B66C 23/90 200/82 R |
| 3,767,061 A * | 10/1973 | Tax | B66C 23/90 212/276 |
| 3,784,797 A * | 1/1974 | Kroll | G06G 1/04 235/78 R |
| 4,211,332 A * | 7/1980 | Pitman | B66C 23/90 116/284 |
| 4,516,116 A * | 5/1985 | White | B66C 23/905 340/665 |
| 5,012,939 A * | 5/1991 | Pitman | B66C 23/90 212/231 |

(Continued)

FOREIGN PATENT DOCUMENTS

KR    100864872 B1  * 10/2008
KR   20080092989 A  * 10/2008

OTHER PUBLICATIONS

Lifting Capacity Charts TechniComm News No. 28—Dec. 2006 http://www.truckcranesolutions.com/ecmedia/prodinfo/fassi/technicomm/NL028_06_MKT_EN.pdf.

*Primary Examiner* — Charles R Kasenge
(74) *Attorney, Agent, or Firm* — King & Schickli, PLLC

(57) ABSTRACT

An apparatus for providing a user with a lifting capacity of a lifting machine includes a graphical display displaying a spectrum of lifting capacity across a continuous range of boom height and boom radii. Related methods are disclosed.

24 Claims, 9 Drawing Sheets
(3 of 9 Drawing Sheet(s) Filed in Color)

(56) References Cited

U.S. PATENT DOCUMENTS

| | | | | |
|---|---|---|---|---|
| 5,160,055 | A | * | 11/1992 | Gray ................ B66C 23/90 212/278 |
| 5,217,126 | A | * | 6/1993 | Hayashi ............ B66C 23/905 212/277 |
| 5,538,149 | A | * | 7/1996 | Martin ............... B66C 23/905 212/270 |
| 5,598,935 | A | * | 2/1997 | Harrison ........... B62D 49/085 180/69.1 |
| 5,645,181 | A | * | 7/1997 | Ichiba ................ B66C 13/46 212/281 |
| 5,730,305 | A | * | 3/1998 | Ichiba ............... B66C 23/905 212/276 |
| 6,170,681 | B1 | * | 1/2001 | Yoshimatsu ....... B66C 23/905 212/278 |
| 6,536,615 | B2 | * | 3/2003 | Nishikino .......... B66C 23/905 212/168 |
| 6,587,795 | B2 | | 7/2003 | Schmid |
| 8,014,982 | B2 | | 9/2011 | Kang et al. |
| 8,024,165 | B2 | | 9/2011 | Kato |
| 8,095,346 | B2 | | 1/2012 | Fukuda et al. |
| 8,275,591 | B2 | | 9/2012 | Hubler Armin et al. |
| 9,169,108 | B2 | * | 10/2015 | Tanizumi ........... B66C 23/905 |
| 2001/0042031 | A1 | * | 11/2001 | Tanaka ............... G06Q 10/087 705/27.1 |
| 2003/0082041 | A1 | * | 5/2003 | Barney .............. B66F 9/0655 414/685 |
| 2005/0098520 | A1 | | 5/2005 | Frankenberger et al. |
| 2008/0004898 | A1 | * | 1/2008 | Hubler .............. B66C 23/905 703/7 |
| 2008/0053945 | A1 | * | 3/2008 | Schneider .......... B66C 15/045 212/276 |
| 2008/0243456 | A1 | | 10/2008 | Hudetz et al. |
| 2011/0025717 | A1 | * | 2/2011 | Gilmore ........... G06F 3/04855 345/661 |
| 2011/0082668 | A1 | | 4/2011 | Escrig et al. |
| 2011/0088970 | A1 | * | 4/2011 | Beji .................. B66F 11/046 182/18 |
| 2012/0101694 | A1 | * | 4/2012 | Morath .............. B66C 23/905 701/50 |
| 2014/0035923 | A1 | * | 2/2014 | Oshima ............. G06T 11/60 345/440 |

* cited by examiner

| Rated Lifting Capacities In Pounds | Intermediate | | | | 14,000 lb | | EM 1 | |
|---|---|---|---|---|---|---|---|---|
| Load Radius (ft) | 41.4 ft | | 55.0 ft | | 70.0 ft | | 85.0 ft | | 100.0 ft | |
| | ∡° | 360° | ∡° | 360° | ∡° | 360° | ∡° | 360° | ∡° | 360° |
| 10 | 69.0 | 227,400 | 74.5 | 77,300 | 77.5 | 51,000 | | | | |
| 12 | 66.0 | 202,700 | 72.5 | 77,300 | 76.5 | 51,000 | | | | |
| 15 | 61.0 | 165,000 | 69.0 | 77,300 | 74.0 | 51,000 | 76.5 | 51,200 | | |
| 20 | 52.0 | 84,000 | 63.0 | 77,300 | 69.5 | 51,000 | 73.5 | 51,200 | 76.0 | 47,900 |
| 25 | 41.5 | 52,300 | 56.5 | 57,500 | 65.0 | 51,000 | 70.0 | 51,200 | 73.5 | 47,900 |
| 30 | 27.0 | 35,800 | 49.5 | 40,700 | 60.0 | 43,500 | 66.5 | 44,100 | 70.5 | 43,600 |
| 35 | | | 41.5 | 30,400 | 55.0 | 33,200 | 62.5 | 33,900 | 67.0 | 34,300 |
| 40 | | | 32.0 | 23,400 | 49.5 | 26,100 | 58.0 | 26,900 | 63.5 | 27,300 |
| 45 | | | 17.5 | 18,400 | 43.5 | 21,000 | 54.0 | 21,800 | 60.5 | 22,200 |
| 50 | | | | | 36.5 | 17,200 | 49.5 | 17,900 | 56.5 | 18,400 |
| 55 | | | | | 28.0 | 14,100 | 44.5 | 15,000 | 53.0 | 15,500 |
| 60 | | | | | 15.0 | 11,700 | 39.0 | 12,500 | 49.0 | 13,100 |
| 65 | | | | | | | 33.0 | 10,500 | 45.0 | 11,000 |
| 70 | | | | | | | 25.0 | 8,800 | 40.5 | 9,400 |
| 75 | | | | | | | 13.5 | 7,400 | 35.5 | 7,900 |
| 80 | | | | | | | | | 30.0 | 6,700 |
| 85 | | | | | | | | | 23.0 | 5,700 |
| 90 | | | | | | | | | 12.0 | 4,800 |
| Min.Bm. Ang./Cap. | 0.0 | 29,400 | 0.0 | 17,200 | 0.0 | 11,100 | 0.0 | 7,100 | 0.0 | 4,500 |
| Radius (ft) | 32.8 | | 46.5 | | 61.5 | | 76.5 | | 91.5 | |

FIG. 2

DISPLAY FOR DISPLAYING LIFTING CAPACITY OF A LIFTING MACHINE AND RELATED METHODS

This application claims priority to U.S. Provisional Patent Application Ser. No. 61/754,816, filed Jan. 21, 2013, the disclosure of which is incorporated by reference.

TECHNICAL FIELD

This disclosure relates generally to lifting machines and, more particularly, to a display for displaying lifting capacity and related methods.

BACKGROUND OF THE INVENTION

Lifting machines and, in particular, cranes typically have lifting capacity limits under which they may operate safely. These capacities generally depend on the position at which a load is maintained under a given configuration (i.e., counterweight, outrigger position, boom extension mode, etc.). Regulations generally require that a crane manufacturer provide certain tables which list the capacity of a given crane under a given configuration at various lifting positions. Those tables are sometimes referred as capacity charts. The information in such tables may be programmed in an electronic rated capacity limiter (RCL) device associated with the crane.

In preparation for a given working project, it is often necessary to determine a working range and the lifting capacity of the lifting machine made available to complete the project. Generally, the user must consult one or more work range diagrams, such as that shown in FIG. 1, in order to confirm that a given crane may operate under the range of motion necessary to complete the project. These work range diagrams, however, do not generally include any information regarding the crane's lifting capacity at a given lifting position. Therefore, the user must also consult one or more capacity tables, such as that illustrated in FIG. 2. These capacity tables generally provide a list of rated lifting capacities at various positions for a given crane under a given configuration. In the example capacity table of FIG. 2, capacities are listed for a given crane with a counterbalance load of 14,000 lb. and outriggers positioned at an intermediate position. Should the user choose to vary the configuration of the crane (i.e. change the outrigger position or modify the counterbalance load), it would become necessary to consult one or more other capacity tables.

The above procedures may be tedious and time consuming for the user. Additionally, the current tables and diagrams only provide discrete points corresponding to a given position and crane configuration at which to determine lifting capacity. Furthermore, the current procedures do not provide an efficient manner of comparing capacities across different product lines and/or crane models.

The disclosed inventions aim to address these and other shortcomings of the above procedures and to provide an improved manner of determining or evaluating lifting capacities, as outlined herein.

SUMMARY

One aspect of the disclosure pertains to a method of estimating on a computing device the lifting capacity of a lifting machine including a boom. The method comprises providing a computing device configured for allowing a user to input a boom operating condition and obtain at least one predicted lifting capacity for the lifting machine.

The method may further include the step of displaying the at least one predicted lifting capacity to the user based on the user input. This may involve displaying a continuous spectrum corresponding to a range of lifting capacities over a plurality of boom operating conditions. In such case, the step of providing the user input may comprise allowing the user to select particular boom operating conditions from anywhere in the spectrum, prior to the step of displaying the at least one predicted lifting capacity.

The displaying step may also comprise displaying to the user a plurality of colors corresponding to different lifting capacities. This may include displaying a first color as a first representation of a first lifting capacity range and a second color as a second representation of a second lifting capacity range. The displaying step may also include displaying the at least one lifting capacity in a numerical format on a display associated with the computing device.

The method may further include the step of determining the at least one lifting capacity at a user-selected first boom height and boom radius between at least two pre-determined values of lifting capacity for different boom heights and boom radii. The method may include retrieving the pre-determined values in a memory associated with the computing device. The method may include retrieving the pre-determined values remotely from the computing device, and transmitting the pre-determined values to the computing device.

A further aspect of the disclosure pertains to a method of providing a user with a lifting capacity of a lifting machine as a function of a boom height and boom radius of the lifting machine. The method comprises graphically displaying a continuous spectrum representative of lifting capacities across a range of boom operating conditions. The method may include the step of displaying the continuous spectrum in color.

The method may further include the step of providing a user input for allowing a user to select for display a lifting capacity anywhere along the continuous spectrum, and may further includes the step of displaying the lifting capacity to the user on or adjacent to the continuous spectrum. The method may further include the step of determining the predicted lifting capacity for a selected boom height and boom radius based on at least two pre-determined lifting capacities, each of the pre-determined lifting capacities being for a different boom height and boom radius, and further including the step of displaying the predicted lifting capacity to the user.

A further aspect of the disclosure relates to a method for assisting in the selection of a lifting machine for a project from a plurality of lifting machine options. The method comprises, on a computing device, providing a user input for inputting a desired lifting capacity. The method further comprises, using the computing device, identifying to the user (a) one or more lifting machines capable of meeting the inputted desired lifting capacity for the particular operating condition; or (b) at least one positional limit for a given lifting machine based on the desired lifting capacity.

The method may further include displaying an identifier of the lifting machines capable of meeting the inputted load capacity to the user on a display associated with the computing device. The method may also include identifying the boom height and boom radius limits the given lifting machine based on the desired lifting capacity.

Still a further aspect of the disclosure pertains to a method of allowing a user to assess a lifting capacity of a lifting machine. The method comprises displaying across a range of boom heights and boom radii an object representative of a pre-determined range of lifting capacities. The method may include the step of providing the object so as to represent an acceptable lifting capacity of the lifting machine and an unacceptable lifting capacity of the lifting machine. The method may further include the step of displaying the acceptable lifting capacity in a first color and displaying unacceptable lifting capacity in a second color, as well as providing a color spectrum on the object representative of different lifting capacities.

Yet another aspect of the disclosure pertains to an apparatus for providing a user with a predicted lifting capacity of a lifting machine. The apparatus comprises a graphical display displaying a continuous spectrum of lifting capacity across a continuous range of boom operating conditions. The apparatus may further include a computing device for providing the graphical display. An input may also be included for allowing the user to select as the operating condition a boom height and a boom radius anywhere along the lifting capacity spectrum. A numerical display of the predicted lifting capacity based on the user-selected boom height and boom radius may be provided, along with a numerical display of the user-selected boom height and boom radius. The spectrum of lifting capacity is displayed in a plurality of different colors, which may comprise a first color corresponding to an unacceptable lifting capacity and a second color corresponding to an acceptable lifting capacity.

BRIEF DESCRIPTION OF THE DRAWINGS

This patent or application file contains at least one drawing executed in color. Copies of this patent or patent application publication with color drawing(s) will be provided by the U.S. Patent and Trademark Office upon request and payment of the necessary fee.

FIGS. 1 and 2 illustrate charts for determining lifting capacity;

DETAILED DESCRIPTION OF THE INVENTION

In order to improve the evaluation of lifting capacities at various configurations of a lifting machine, such as a crane, a mapping technique is disclosed. This mapping technique may be used to provide a visual representation of lifting capacity, as well as allowed working range of a crane with specified configurations within a diagram. In one embodiment, the technique may provide an interactive graphical representation of crane capacity for a variety of boom operating conditions (e.g., boom height versus boom radius values), such that a user may manipulate operational conditions that may reflect a change in lifting capacity. These operational conditions may also include the counterweight amount, outrigger position, and boom extension mode.

In one embodiment, the discrete values listed in at least one capacity table for one crane in a given configuration, such as that of FIG. 2, are used to determine the lifting capacity of the crane between the discrete, pre-determined lifting capacities. This determination may be used to determine the capacity at a given crane position not listed in the capacity table through any form of calculation, such as interpolation or regression (whether linear or non-linear). The interpolated values may be used to determine a continuum of lifting capacities at various positions of a given crane in a given configuration or operating condition, which may be provided by the user. The lifting capacity continuum or range may be displayed to the user in a continuous or full spectrum, such as in the form of an object, and the user may select individual values for display (such a numerically, and possibly in combination with the corresponding operating conditions selected, such as a given boom height or radius).

Figure 3:
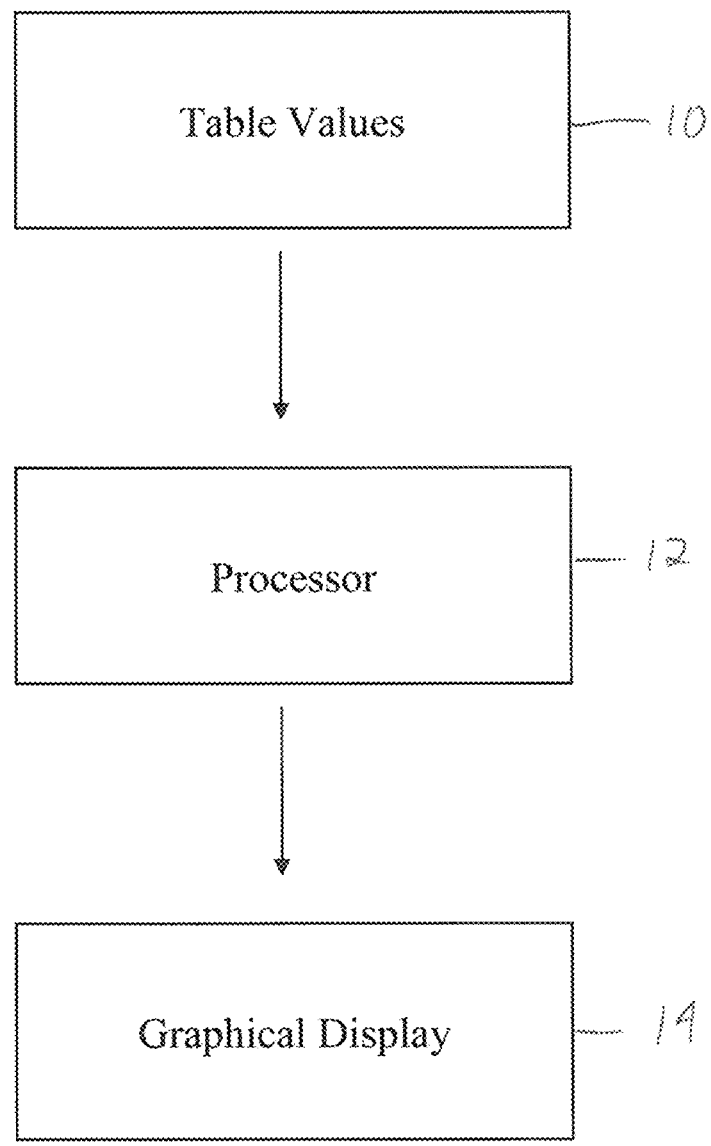
FIG. 3 is a flow chart illustrating one aspect of a graphical display of lifting capacity.

FIG. 3 illustrates a block diagram of one process for arriving at a graphical display of the continuous spectrum representative of a range of lifting capacities. Pre-determined values relating to position, configuration, and predicted lifting capacity may be taken from a database of table values 10. These table values 10 may be evaluated by a processor 12 capable of determining the discrete table values 10 (such as by interpolation) so as to estimate lifting capacity at various positions under various configurations not specifically disclosed in the table values. The processor may then output the interpolated lifting capacity values in graphical form to a display 14 for visual evaluation. This display may include an interactive feature, such that a user may manipulate one or more values or characteristics of the interpolation analysis, thereby resulting in a manipulation of the graphical representation.

In one embodiment, the data may be stored, optionally interpolated, and displayed on a display associated with a computing device. For example, a portable computing device such as a phone, tablet computer, or laptop, or a stationary device such as a desktop (and any of which may also be positioned on the lifting vehicle, such as in an operator's cab), may be used to display the data. The display may further include one or more graphical illustrations plotting various positional elements and corresponding lifting capacities of the crane at a given configuration.

In another embodiment, the table values 10 may be stored at a remote location, such as on a computer server, while a portable or stationary computing device may remotely access the table values 10, via a wired or wireless network. In this embodiment, a processor on the computing device may be used to determine the values and the display 14 for the graphical representation for the user.

In a further embodiment, the storage of the table values 10 and the processor 12 for interpolating the data may be located at a first location, while a user may utilize a computing device at a remote location for accessing the processed data. Such access may occur via a wired or wireless network. In this embodiment, the remote computing device may include the display 14 for displaying the graphical representation.

Figure 4:
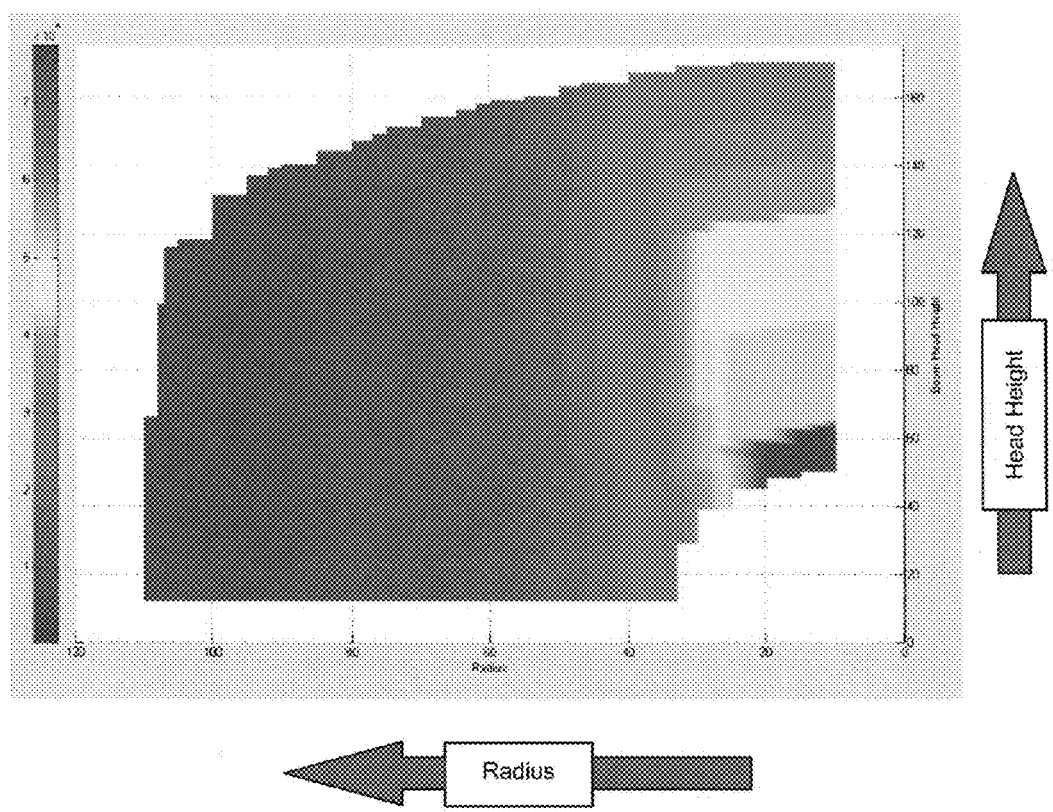
FIGS. 4-9 illustrate graphical representations of lifting capacity displays.

With reference to FIG. 4, one example of such a graphical representation of estimated lifting capacity is an object in the form of a continuous spectrum. As illustrated, values for lifting capacity may be assigned different colors (which include shades of the same color, such as blue and light blue, for example). In the illustrated embodiment, a multi-color spectrum having a continuous extent and boundary forms a spatial representation to which certain colors may be assigned (e.g., reds and oranges, or blacks, whites, and grays if grayscale) to higher lifting capacities, such as those in the lower right corner of the figure. Different colors (e.g., yellows and greens) may be assigned to intermediate capacities such as those immediately above the higher lifting capacities. Still other different colors (blues and violets) may be displayed corresponding to lighter capacities such as those in the remaining portions of the graph. These lifting capacities may then be displayed as a function of the relative height and horizontal distance of the operating load from a given crane under a given configuration (e.g., with 14,000 lb. counterweight and outriggers positioned at an intermediate position).

The crane configurations may vary according to various crane specifications. The height of the load may be defined in terms of the boom length or the operational height of the load above ground level. The horizontal distance between the load and the crane may be defined in terms of an operating load radius (i.e. a horizontal distance between the operating load and the centerline of rotation of the crane). The continuum of the color coded capacity spectrum may then be plotted as a function of load height and operating load radius as shown in FIG. 4. In this manner, the user may visualize the boundaries of a given lifting capacity over a range of loading positions for a given crane configuration, and quickly and easily determine when an acceptable lifting capacity is present and when an unacceptable lifting capacity may be present for that particular configuration.

Figure 5:
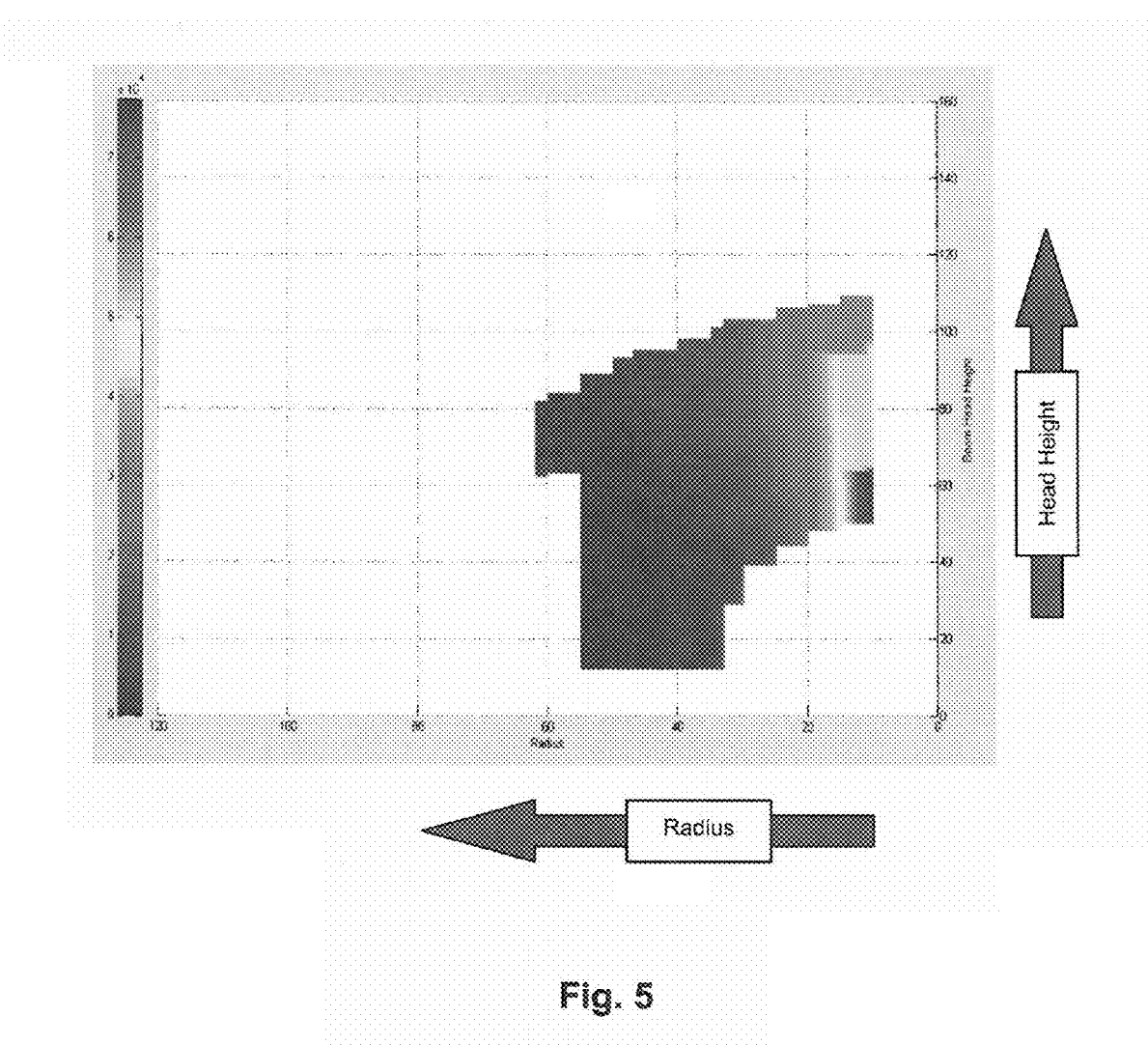

With reference to FIG. 5, a second color coded capacity spectrum is illustrated for comparison. In FIG. 5, the properties of a different crane are depicted, wherein the crane has a shorter overall boom length. Under the given configuration for the second crane, the color coded capacity spectrum of FIG. 5 allows the user to easily visualize the range of load positions at which the second crane may lift heavier, "red" load capacities (e.g. from about 50-62 feet head height and 10-15 feet operating load radius). This may easily be visually compared to the first crane of FIG. 4, which may lift heavier (e.g., "red") capacities over a larger range of positions (e.g. from about 50-62 feet head height and 10-25 feet operating load radius).

Figure 6A:
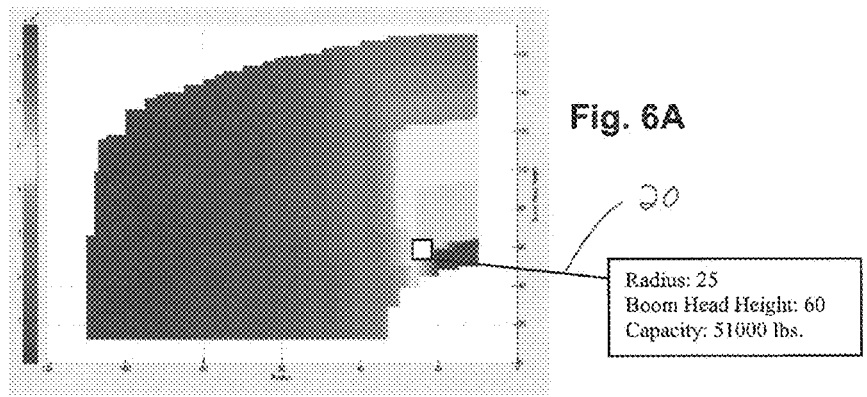
Figure 6B:
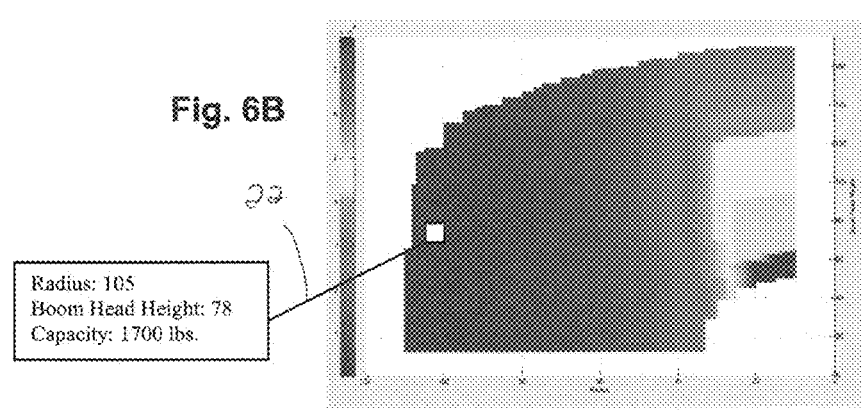
Figure 6C:
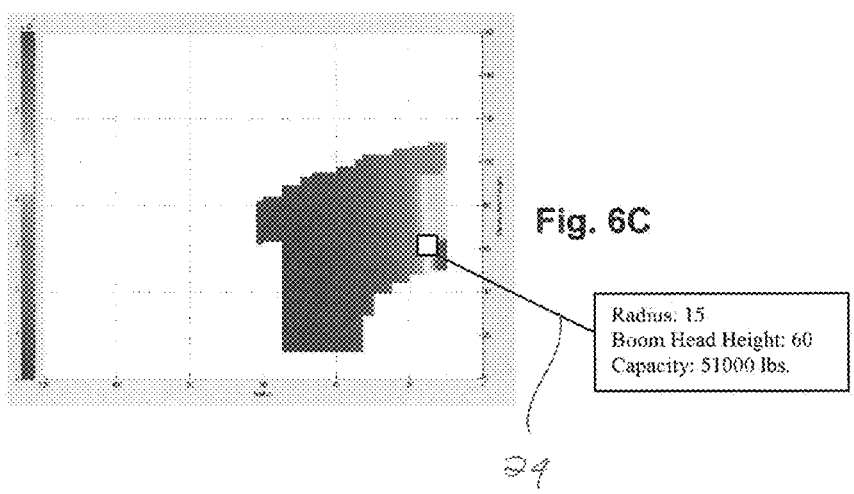

In a further embodiment, as illustrated in FIGS. 6A-6C, an interactive color coded capacity spectrum is illustrated. This interactive graphical display may be presented on a screen of a stationary or portable computing device such as a desktop or laptop computer, a tablet computer, a phone, or any other form of interactive device where a user input may be used to select a particular condition of the lifting machine. The interactive display may include one or more interactive features. These interactive features may include a "point-and-click" feature in which a user may select a given position on the display (such as by using a pointing device or by way of a touch screen), and may receive an indication of the lifting capacity of the crane at that point, such as in a textual or aural format. The interactive feature may also include presenting the user with an option to manually enter the precise coordinates of a given position, at which point the display may visually present the location on the graph and may present the user with the lifting capacity at that location. The need for providing discrete lifting capacity values or tables is thus eliminated.

For example, FIGS. 6A and 6B illustrate an interactive version of the continuous spectrum of FIG. 4. In FIG. 6A, the user has selected a first position 20 with an operating radius of 25 feet and a boom head height of 60 feet. At this first position 20, the spectrum displays the lifting capacity at that position as 51,000 lbs. For comparison, in FIG. 6B, the user selected a second position 22 with an operating radius of 105 feet and a boom head height of 78 feet, which displays a lifting capacity of only 1,700 lbs.

FIG. 6C illustrates an interactive version of the spectrum of FIG. 5. In FIG. 6C, the user has selected a third position 24 associated with the crane of FIG. 6C, said third position 24 at an operating radius of 15 feet and a boom head height of 60 feet. At this third position 24, the display illustrates to the user that the lifting capacity of the crane is 51,000 lbs.

A comparison of FIG. 6A to FIG. 6C allows the user to graphically visualize the difference between the positions at which two different cranes may support a load of 51,000 lbs. Specifically, the displays indicate that the crane of FIG. 6A may support a load of 51,000 lbs at a boom head height of 60 feet and up to an operating radius of 25 feet, whereas the crane of FIG. 6C may only support the same load at the same height up to an operating radius of 15 feet. Through comparisons such as this, a user may efficiently evaluate various cranes and/or crane configurations for a given working project.

Figure 7:
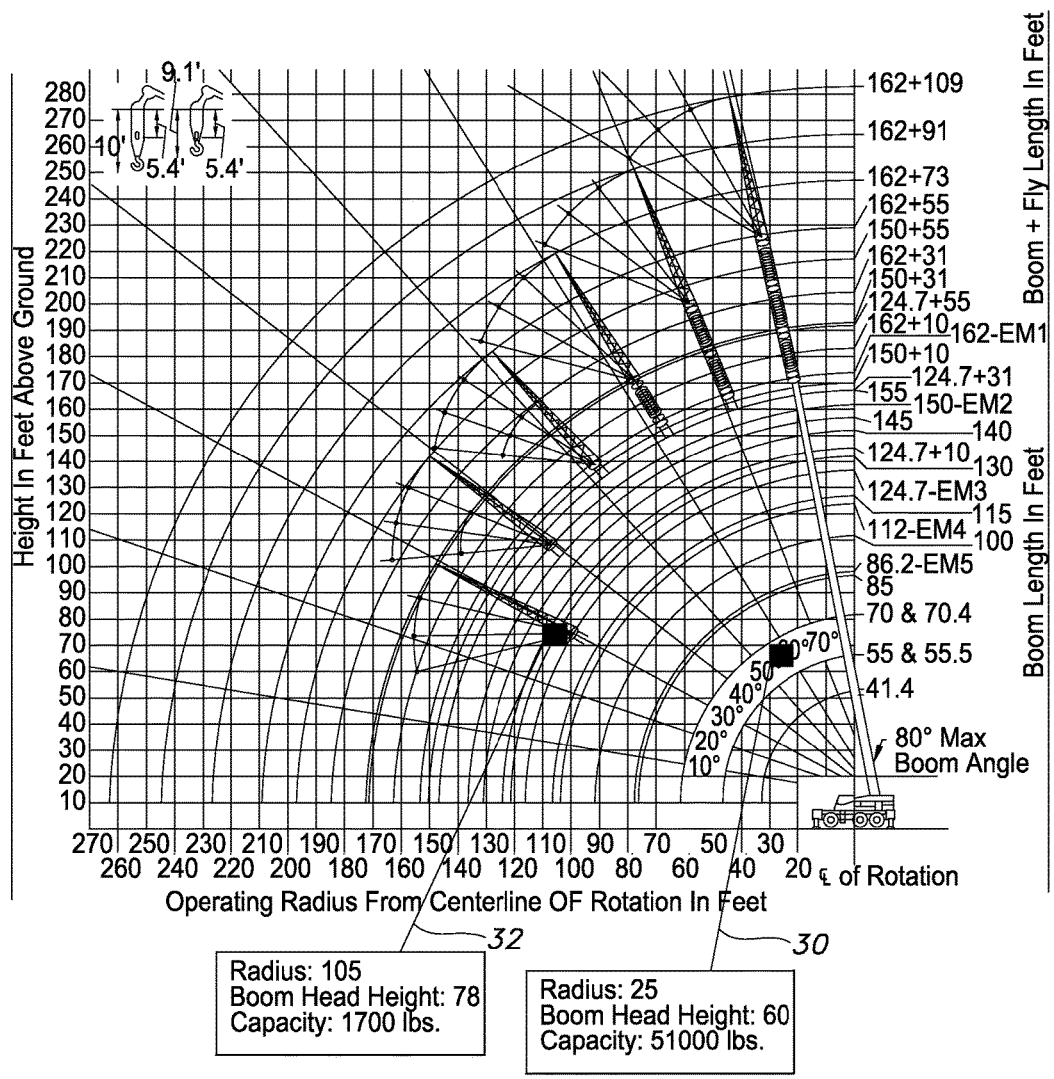

In a further embodiment, the above determined values may be applied to create an interactive work range diagram. With reference to FIG. 7, a work range diagram may be presented to a user. The user may input a given crane model and/or crane configuration. The user may further select a first location 30 based on the operating radius and height of a load, such as through a "point-and-click" method. At that location, the display may present the user with the capacity of the crane in the given configuration. In the illustrated embodiment, the user has selected the first location 30 which corresponds to an operating radius of 25 feet and a boom head height of 60 feet, which displays the capacity of 51,000 lbs. Similarly, the user may select a second location 32 at an operating radius of 105 feet and a boon head height of 78 feet. At this point, the display may convey that the corresponding lifting capacity is 1,700 lbs.

Figure 8:
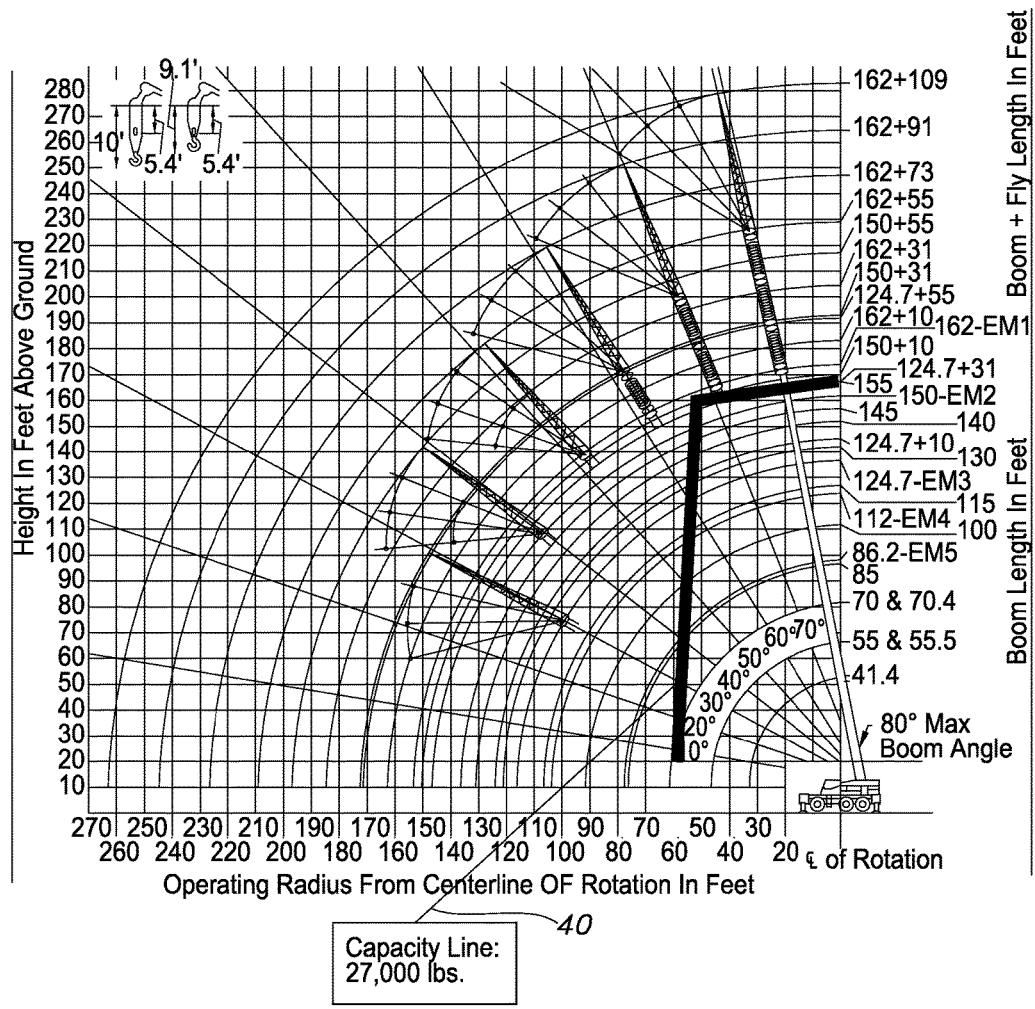

Another embodiment of an interactive work range diagram is illustrated in FIG. 8. In this embodiment, the user may select a given crane and/or crane configuration. The user may also present a desired lifting capacity for a given project. A capacity line 40 corresponding to the positional limits at which the crane may carry the capacity load may be displayed. For example, in FIG. 8, the user has selected a lifting capacity of 27,000 lbs. for a given crane and configuration. The display may illustrate the capacity line 40, showing the height and operational radius limits at which the crane may carry 27,000 lbs.

Figure 9:
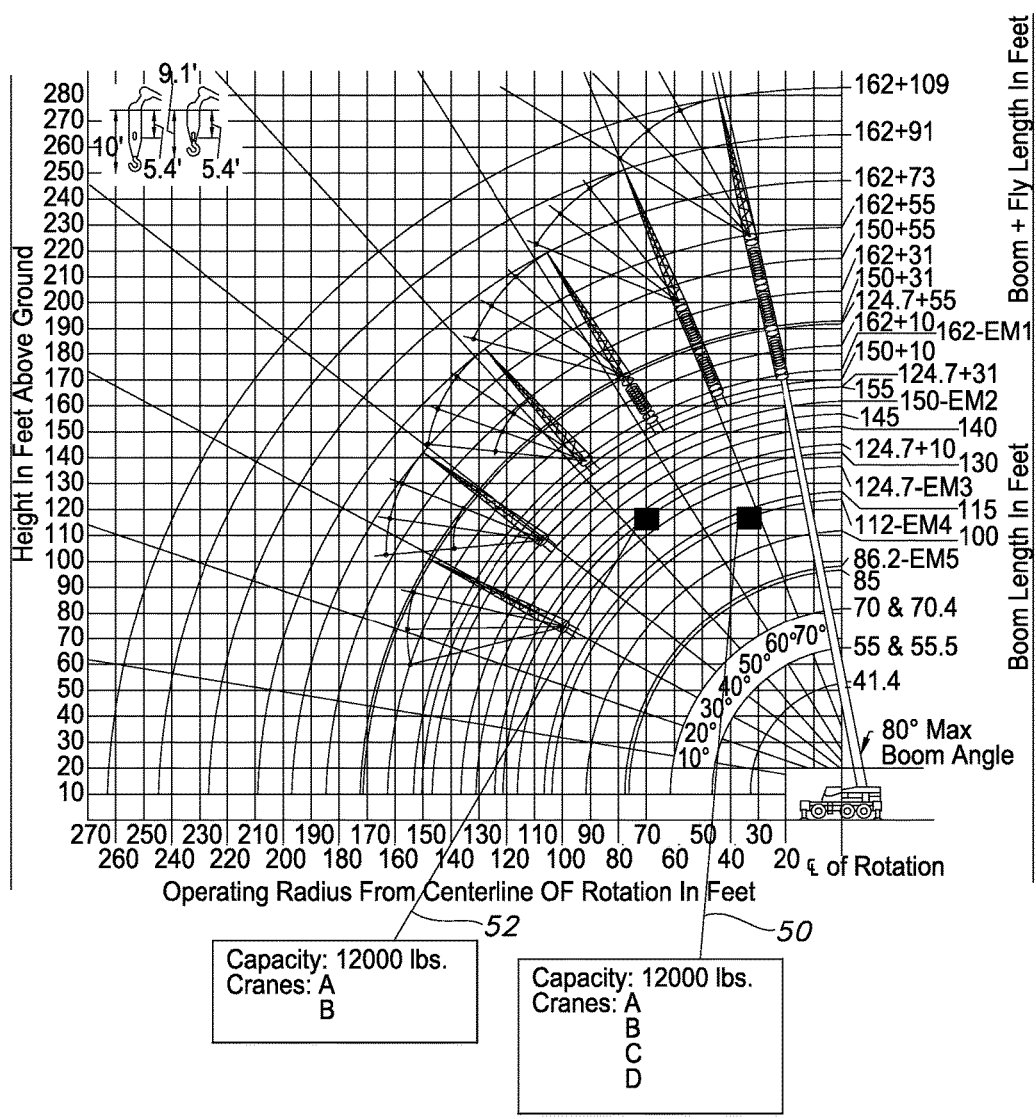

In a further embodiment, an interactive work range diagram is presented in FIG. 9. In this embodiment, the user may input data (e.g., a load) relative to a lifting capacity associated with a given project. The user may then select one or more locations 50, 52 corresponding to potential lifting locations which may be associated with the project. Based on a collection of interpolated values associated with a plurality of cranes and/or crane configurations as described above, the display may present the user with options for various cranes which may have the capacity to accommodate the working project. For example, in FIG. 9, the user has selected 12,000 lbs. as a lifting capacity that will be necessary for the working project. The user may select a first location 50, and the display may present a number of cranes which may be capable of lifting the desired load at that position, namely cranes A, B, C, and D. The user may further select a second location 52 that may be necessary for the same working project, or for an additional working project.

The display may present a list of cranes capable of lifting the desired load at said second location 52, namely cranes A and B. In doing so, the user may evaluate one or more positions associated with one or more working projects in order to determine the appropriate crane for the user.

Another feature of the invention allows for the sequential or simultaneous display of graphical representations of lifting capacity for given boom conditions for a plurality of different lifting machines. This allows the user to compare and contrast the abilities of the different machines in a quick and intuitive manner, and thus allow for the appropriate selection to be made in a highly efficient manner.

In a further embodiment, the invention provides an interactive interface which allows the user to input information for various configurations, such as different outrigger positions or counterweights, and then have the appropriate graphical representation displayed. The values for the various configurations may be stored in particular look-up tables, which can then be accessed based on the user's selection. Accounting for these various configurations may alter the visualized spectrum for a given crane or lifting machine, thereby displaying altered lifting capacities for the crane.

Figure 1:
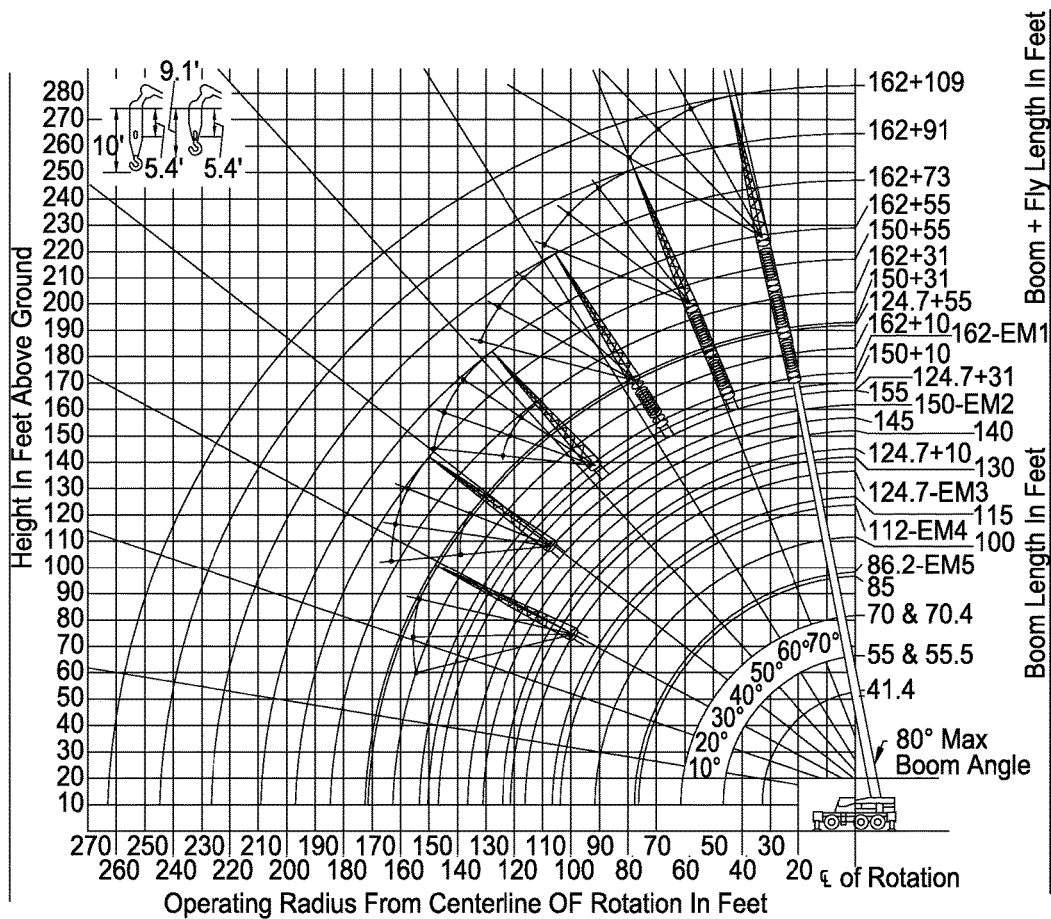

The foregoing description of certain embodiments provides the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. While the disclosure presents certain embodiments to illustrate the inventive concepts, numerous modifications, alterations, and changes to the described embodiments are possible without departing from the sphere and scope of the present invention. In particular, any of the disclosed interactivities may be utilized with any of the graphs disclosed herein. Furthermore, the characteristic assigned to lifting capacity is not limited to a two-dimensional graph. For instance, lifting capacity may be assigned a value on a third axis, such that a three dimensional surface may be presented which plots an interaction between operating radius, boom height, and lifting capacity. In addition, the graphical display may be both interactive and may include both a pictorial representation of the working range of a crane (such as is displayed in FIG. 1) with an overlapping continuum of the lifting capacity of the crane at various positions (such as in FIGS. 4-6C), which may or may not be in color. Accordingly, it is intended that the present disclosure not be limited to the described embodiments, but that it has the full scope defined by the language of the following claims, and equivalents thereof.

The invention claimed is:

1. A method of estimating on a computing device the lifting capacity of a lifting machine including a boom, comprising:
   using the computing device, displaying to a user a single graphical representation providing a continuous spectrum of lifting capacities over a plurality of boom heights and a plurality of boom radii;
   wherein the displaying step comprises displaying to the user a plurality of colors corresponding to different lifting capacities within the continuous spectrum.

2. The method of claim 1, further including the step of displaying at least one predicted lifting capacity for the lifting machine to the user based on a user input.

3. The method of claim 2, further including the step of allowing the user to select from anywhere in the continuous spectrum, prior to the step of displaying the at least one predicted lifting capacity corresponding to the user input.

4. The method of claim 1, wherein the displaying step comprises displaying a first color as a first representation of a first lifting capacity range and a second color as a second representation of a second lifting capacity range.

5. The method of claim 2, wherein the displaying step comprises displaying the at least one lifting capacity in a numerical format on a display associated with the computing device.

6. The method of claim 1, further including the step of determining at least one lifting capacity at a user-selected first boom height and boom radius between at least two pre-determined values of lifting capacity corresponding to different boom heights and boom radii.

7. The method of claim 6, further including the step of retrieving the pre-determined values from a memory associated with the computing device.

8. The method of claim 6, further including the step of retrieving the pre-determined values remotely from the computing device, and transmitting the pre-determined values to the computing device.

9. A method of providing a user with a lifting capacity of a lifting machine for a range of boom operating conditions, comprising:
   graphically displaying a single continuous spectrum representative of lifting capacities across the range of boom operating conditions, wherein the boom operating conditions include both a range of boom heights and a range of boom radii; and
   providing a user input for allowing the user to select for display the lifting capacity from anywhere along the continuous spectrum;
   further including the step of displaying the continuum in different colors representative of different lifting capacity values within the continuous spectrum.

10. The method of claim 9, further including the step of determining a predicted lifting capacity for a selected boom height and boom radius based on at least two pre-determined lifting capacities, each of the pre-determined lifting capacities being for a different boom height and boom radius, and further including the step of displaying the predicted lifting capacity to the user.

11. The method of claim 1, wherein the step of displaying the continuous spectrum of lifting capacities includes displaying the plurality of boom heights and the plurality of operating radii for a plurality of different boom angles.

12. The method of claim 1, further including the steps of:
   determining at least one first lifting capacity at a user-selected first boom height and boom radius between at least two pre-determined values of lifting capacity corresponding to different boom heights and boom radii;
   wherein the displaying step comprises assigning a first color as a representation of the first lifting capacity and assigning a second color, different from the first color, as a representation of a second lifting capacity different from the first lifting capacity; and
   wherein the continuous spectrum of lifting capacities corresponds to a continuum of colors.

13. The method of claim 1, wherein the continuous spectrum comprises a continuous color spectrum.

14. The method of claim 9, further including the step of numerically displaying the lifting capacity to the user on or adjacent to the continuous spectrum.

15. An apparatus for providing a user with a predicted lifting capacity of a lifting machine including a boom, comprising:
   a graphical display displaying in a single representation a continuous spectrum of lifting capacity for the boom across a plurality of boom heights and boom radii;

wherein the continuous spectrum of lifting capacity is displayed in a plurality of colors corresponding to different lifting capacities within the continuous spectrum.

16. The apparatus of claim 15, further including a computing device for providing the graphical display.

17. The apparatus of claim 15, further including an input for allowing the user to select a first boom operating condition including a first boom height and a first boom radius anywhere along the continuous spectrum of lifting capacity.

18. The apparatus of claim 17, further including a numerical display of the estimated lifting capacity based on the user-selected first boom height and first boom radius.

19. The apparatus of claim 18, further including a numerical display of the user-selected first boom height and first boom radius.

20. The apparatus of claim 15, wherein the plurality of colors comprise a first color corresponding to an unacceptable lifting capacity and a second color corresponding to an acceptable lifting capacity.

21. A method of estimating on a computing device the lifting capacity of a lifting machine including a boom, comprising:

using the computing device, displaying to a user a single graphical representation providing a continuous spectrum of lifting capacities over a plurality of boom heights and a plurality of boom radii;

displaying at least one predicted lifting capacity for the lifting machine to the user based on a user input; and allowing the user to select from anywhere in the continuous spectrum, prior to the step of displaying the at least one predicted lifting capacity corresponding to the user input.

22. The method of claim 21, further including the step of determining at least one lifting capacity at a user-selected first boom height and boom radius between at least two pre-determined values of lifting capacity corresponding to different boom heights and boom radii.

23. The method of claim 22, further including the step of retrieving the pre-determined values from a memory associated with the computing device.

24. The method of claim 22, further including the step of retrieving the pre-determined values remotely from the computing device, and transmitting the pre-determined values to the computing device.

\* \* \* \* \*